United States Patent [19]

Hubbard et al.

[11] Patent Number: 5,311,124
[45] Date of Patent: May 10, 1994

[54] EMULATED ANALOG OUTPUT MAGNETOSTRICTIVE POSITION TRANSDUCER WITH SET POINT SELECTION

[75] Inventors: Kenneth A. Hubbard, Raleigh; Michael C. Phillips, Gary, both of N.C.

[73] Assignee: MTS Systems Corporation, Eden Prairie, Minn.

[21] Appl. No.: 667,552

[22] Filed: Mar. 11, 1991

[51] Int. Cl.⁵ .............................................. G01B 7/14
[52] U.S. Cl. ............................. 324/207.13; 324/207.12; 324/207.24; 364/561
[58] Field of Search .................. 324/207.12, 207.13, 324/207.22, 207.24, 533; 364/561, 562, 574; 342/94; 367/122, 127; 92/5

[56] References Cited

U.S. PATENT DOCUMENTS

| | | |
|---|---|---|
| 3,898,555 | 8/1975 | Tellerman . |
| 4,071,818 | 1/1978 | Krisst . |
| 4,104,582 | 8/1978 | Lambersten ...................... 324/533 |
| 4,121,155 | 8/1978 | Chamuel . |
| 4,276,622 | 6/1981 | Dammeyer ..................... 367/127 X |
| 4,319,189 | 3/1982 | Cullum, Jr. et al. . |
| 4,404,523 | 9/1983 | Hughes et al. .................. 324/207.13 |
| 4,433,291 | 2/1984 | Yariv et al. . |
| 4,510,587 | 4/1985 | Schneider .................. 324/207.12 X |
| 4,654,590 | 3/1987 | Kitaura et al. ................. 324/207.13 |
| 4,678,993 | 7/1987 | Vinneman et al. . |
| 4,721,902 | 1/1988 | Tellerman et al. . |
| 4,726,226 | 2/1988 | Tellerman . |
| 4,797,621 | 1/1989 | Anderson et al. ................... 324/533 |
| 4,803,427 | 2/1989 | Mason et al. . |
| 4,809,001 | 2/1989 | Urkowitz et al. ..................... 342/94 |
| 4,952,873 | 8/1990 | Tellerman ..................... 324/207.13 |

Primary Examiner—Gerard R. Strecker
Attorney, Agent, or Firm—Merchant, Gould, Smith, Edell, Welter & Schmidt

[57] ABSTRACT

A linear position indicator which converts the position of a magnet to an analog voltage. The illustrative sensor incorporates a velocity adaptive noise window to improve sensor performance in the presence of noise.

3 Claims, 8 Drawing Sheets

EMULATED ANALOG OUTPUT MAGNETOSTRICTIVE POSITION TRANSDUCER WITH SET POINT SELECTION

BACKGROUND OF THE INVENTION

1. Field of the Invention

The present invention relates to linear position transducers of the magnetostrictive type. More particularly, the exemplary transducer; permits the user to arbitrarily assign set points defining the active measurement stroke of the transducer; permits the user to assign analog output voltages to the set points. The exemplary transducer also incorporates a velocity dependant inhibit window to improve transducer performance in the presence of noise.

2. Description of the Prior Art

Magnetostrictive linear position transducers, are robust, high resolution position indication instruments which have proven to be useful in many measurement and control applications. Commercial magnetostrictive transducers have been available with 0–10 Volt, and 4–20 mA, analog signal outputs. Transducers with timed TTL pulse outputs have also been available. In these devices, the analog signal level or analog time interval indicates the measured distance. It is expected that magnetostrictive devices will become more commonly used in applications which currently rely on other technologies to transduce position into an analog output voltage. Adoption of magnetostrictive transducers will be facilitated by providing sensors which emulate or mimic industry standard voltage output interface protocols, as taught by the present invention. Examples of pertinent prior art include:

U.S. Pat. No. 3,898,555 to Tellerman, which discloses a basic magnetostrictive linear position measurement system. A position indicating magnet is positioned along the length of a tubular magnetostrictive waveguide. A pulse generator is used to generate a current pulse in the waveguide. The position magnet interacts with the magnetic field generated around the waveguide by the current pulse. The interaction generates an acoustic reaction wave in the waveguide at the location of the position magnet. This acoustic or sonic pulse is propagated along the waveguide. The time of flight of the acoustic wave, indicates the position of the magnet with respect to a "mode converter" which is attached to the waveguide and which translates the energy of the acoustic echo pulse into an electrical signal. In Tellerman the time intervals between excitation of the waveguide to the detection of the echo controls the application of a DC reference voltage to an analog filter system which generates an averaged DC level indicating position. In this fashion the location of the magnet is converted into an output DC voltage level which indicates the magnet position.

U.S. Pat. No. 4,721,902 to Tellerman, teaches, inter alia, a method of increasing the resolution of the position indication by a technique now called "recirculation". In operation the echo pulse is used to initiate the next interrogation or excitation pulse which is applied to the waveguide. In this sense the return echo are recirculated. The time measurements of multiple recirculations can be averaged to enhance resolution.

This Tellerman patent also teaches the use of a counter based time interval measurement system. In general, the interrogation pulse starts a counter which collects counts from a clock source. The counting process is stopped with a return echo. In this fashion, the time of flight of the sonic pulse is translated into a representative "raw" count. This "raw" count is then transcribed into a corresponding analog voltage.

This Tellerman patent also teaches a time domain filtering technique which sets the duration of an "inhibit timer" based upon the historical output of the transducer. In general, the raw count data is used to set an "inhibit" time interval which is slightly shorter than the expected echo delay time. The output of the mode converter is ignored until the inhibit time has elapsed. This inhibit time is not velocity dependent although it does vary as a function of magnet position. In practice this time domain filtering technique limits the maximum slew rate of the magnet.

However these representative magnetostrictive transducers do not exhibit the ability to arbitrarily assign the output signal voltage to an arbitrary selected portion of the waveguide. The ability to select the active stroke of the transducer is important in many applications. The ability to assign output voltages improves the adaptability of the transducer and permits it to emulate transducers which it replaces. The velocity adaptive inhibit window allows the transducer to accommodate its noise window to the particular application.

BRIEF SUMMARY OF THE INVENTION

In contrast to prior art structures, the present invention permits the user to independently select measurement set points at essentially any position on the waveguide. The user may also independently assign an analog output voltage level to each position set point. The transducer automatically computes a linear output between the voltage set points, for positions between the position set points.

In operation, the user programs the device by temporarily attaching a volt meter to the transducer module and moving the position indicating magnet to the first desired position set point. The user, then manipulates a pair of programming buttons to set the desired output voltage for that specific "first" position set point. The process is repeated to assign an output voltage for the next or "second" set point. The set point position data and set point output voltages data are used to compute intermediate output voltages for intermediate positions. This ability may be used to define an arbitrarily sized active stroke anywhere along the length of a relatively long transducer.

As previously discussed, magnetostrictive transducers rely on the detection of echo pulses on the waveguide to indicate position, since the amplitude of these pulses diminish with distance from the position magnet, they become difficult to detect in the presence of competing noise. To improve noise performance the exemplary transducer adopts a "small" acceptance window for echoes. This window is enlarged under certain circumstances and remains enlarged until the transducer is powered down and up again. The window size is adaptive and is a function of measured magnet velocity.

BRIEF DESCRIPTION OF THE DRAWING

Throughout the figures, identical reference numerals refer to identical structural elements, wherein.

DETAILED DESCRIPTION OF THE PREFERRED EMBODIMENT

An understanding of the inventions in detail requires some familiarity with the overall architecture of the illustrative transducer described herein.

Figure 1:
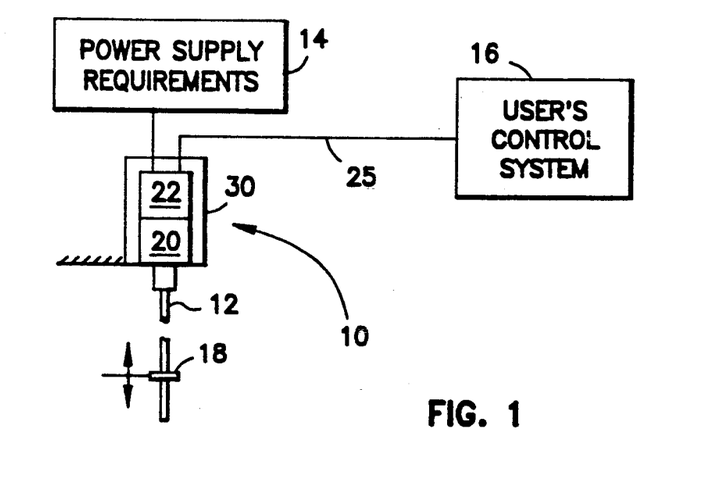
FIG. 1 is a system level schematic diagram depicting the transducer embedded in a user application.

FIG. 1 depicts the magnetostrictive transducer module 10 embedded in a user's measurement and control application. The user supplies an appropriate bipolar power supply 14 and an appropriate control system 16 which utilizes the output of the transducer module 10 supplied to the user's controller via connection 25. The user mounts the transducer module 10 in the application and provides an appropriate mount for the position indicating magnet 18 along the waveguide. In use, the transducer module 10 converts the position of the magnet 18 on waveguide 12 into an analog voltage level transmitted on signal lead 25 for use by the control system 16.

The transducer module 10 itself, is partitioned into a magnetostrictive sensor module 20 and an output conversion module 22. Both modules are contained within a suitable housing 30.

Figure 2:
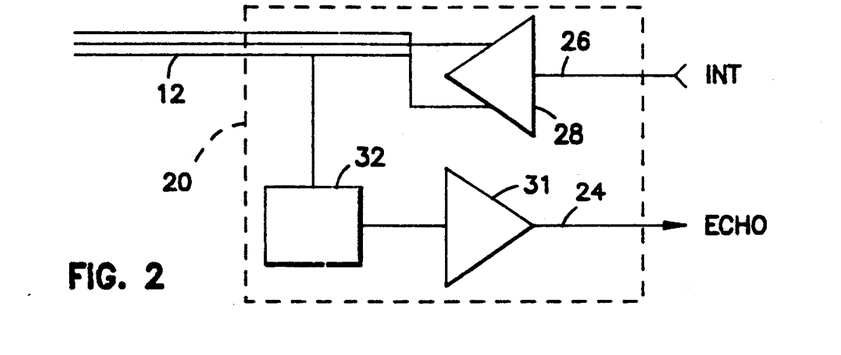
FIG. 2 is a block level schematic diagram depicting the elements of the magnetostrictive sensor module.

FIG. 2 shows the sensor module 20 in isolation. This module is of conventional design and contains a pulse generator 28 and a mode converter 32. The pulse generator 28 supplies high current interrogation pulses to the waveguide 12 in response to an "interrogation" signal, present on signal lead 26. The mode converter 32 is physically coupled to the waveguide 12, and it converts the energy of passing sonic pulses into a corresponding electrical signal. The electrical output of the mode converter is amplified, compared with an appropriate reference level, and level shifted by level shifter circuit 31 to generate a logic level "echo" signal, delivered on signal lead 24, indicating the reception of an acoustic pulse. Reference may be had to U.S. Pat. application Ser. No. 07/644,273 filed Jan. 232, 1991, now U.S. Pat. No. 5,115,195, entitled Multi-Magnet Long Stroke Sensor; U.S. Pat. No. 3,898,555 to Tellerman and U.S. Pat. No. 4,721,902 to Tellerman all of which are, incorporated herein by reference, for examples of suitable magnetostrictive elements for exciting the waveguide and for collecting acoustic pulses off the waveguide.

Figure 3:
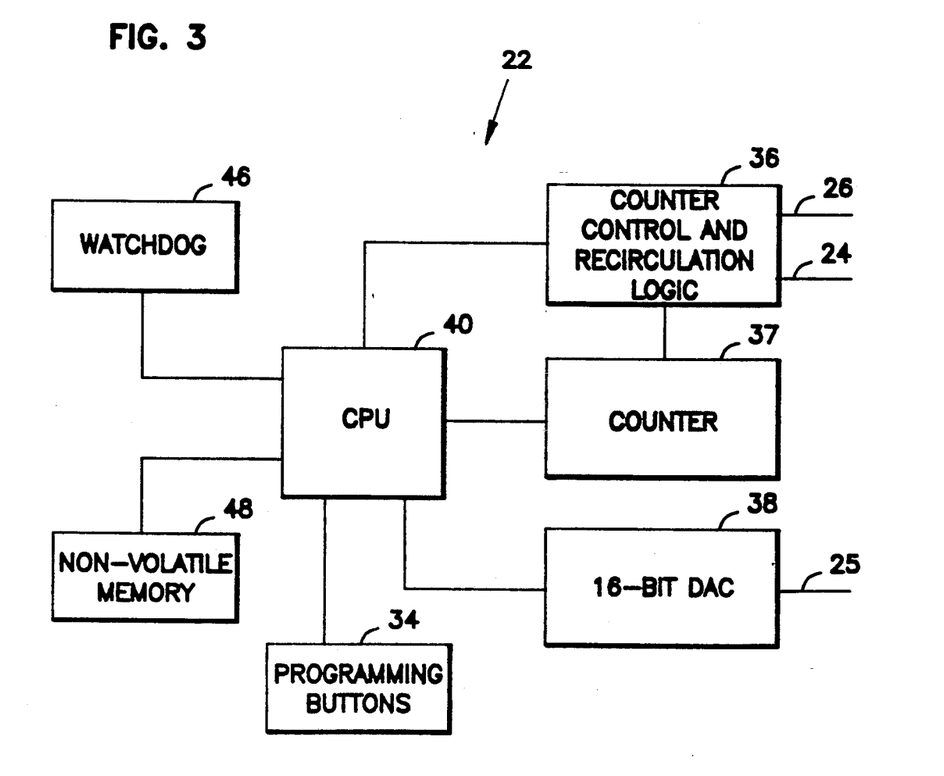
FIG. 3 is a block level schematic diagram depicting the partitioning of digital hardware, within the output conversion module.

FIG. 3 depicts the organization of the output conversion module 22. This module 22 is interfaced to the sensor module through "echo" and "interrogate" signals. This module also accepts user programming information from a pair of programming buttons 34. Once programmed, the module stores the user defined data in non-volatile memory 48. In operation, this output conversion module 22 acquires magnet position information from interaction with the sensor module 20, by interrogating the waveguide 12 and monitoring the time required for the echo signals to return. This timing information is converted to a number, stored in counter 37 through the operation of counter/control logic 36. In operation, distributed counter stages 37 collect clock counts for a time interval determined in part by the number of "recirculations" and in part by the position of the magnet 18 along the waveguide. The contents of the counter 37 after the last recirculation is referred to as the "raw count" data. The raw count data is transferred to the microprocessor 40 under software control. The raw count data is used along with the user defined set point data to compute a velocity dependent window control word and a voltage indication output word. The window control word is used to control the acceptance of "echo" signals from the mode convertor 32. The output word is transferred to the digital-to-analog convertor (DAC) 38. The DAC converts the output word to an output voltage which is supplied to the control system 16 via connection 25.

A watch dog timer 46 restarts the system if software fails to reset the watch dog timer prior to time out.

Hardware Implementation

Figure 4A:
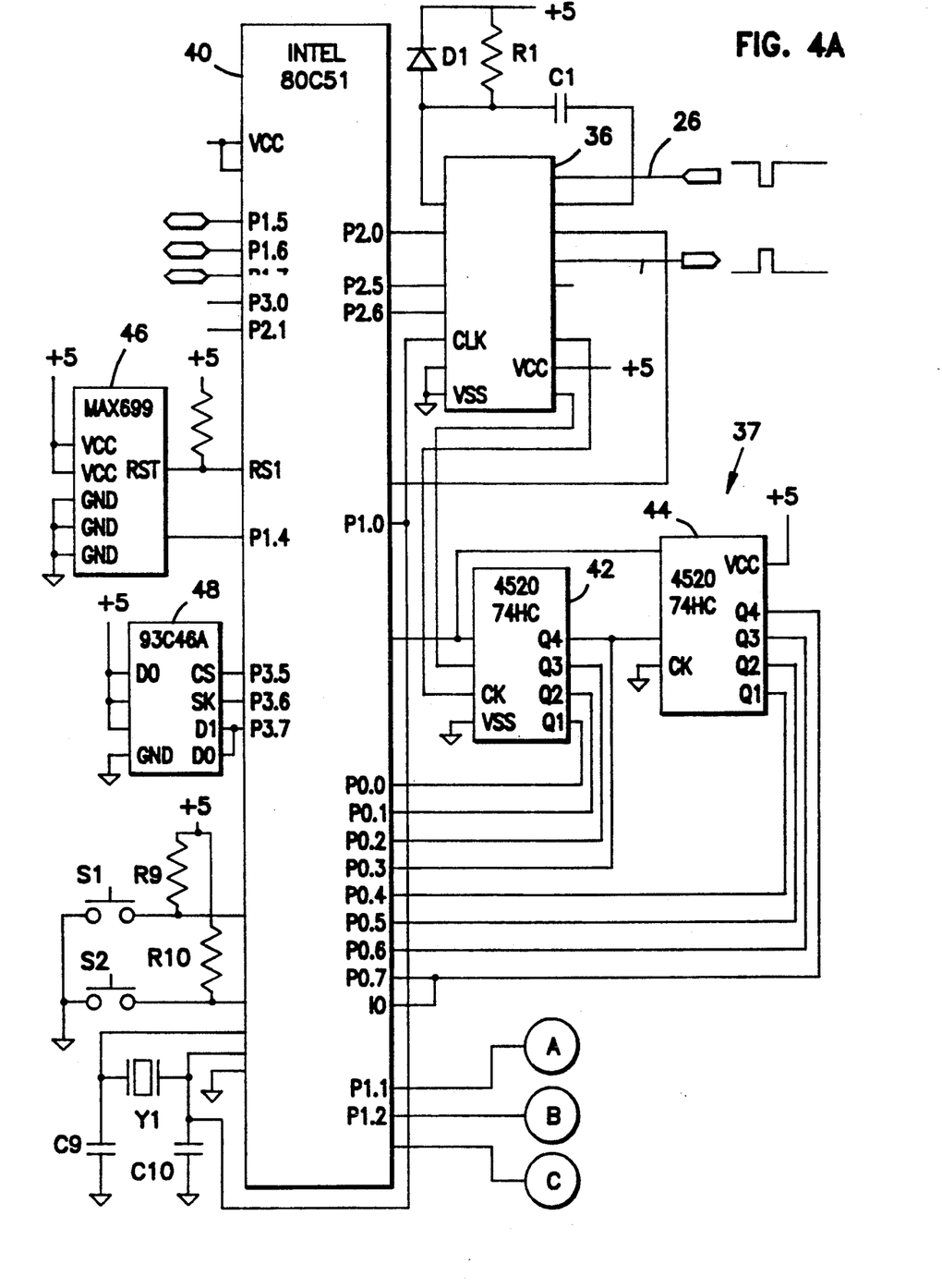
FIGS. 4A and 4B are a set of schematic diagrams depicting an illustrative embodiment of the invention.
Figure 4B:
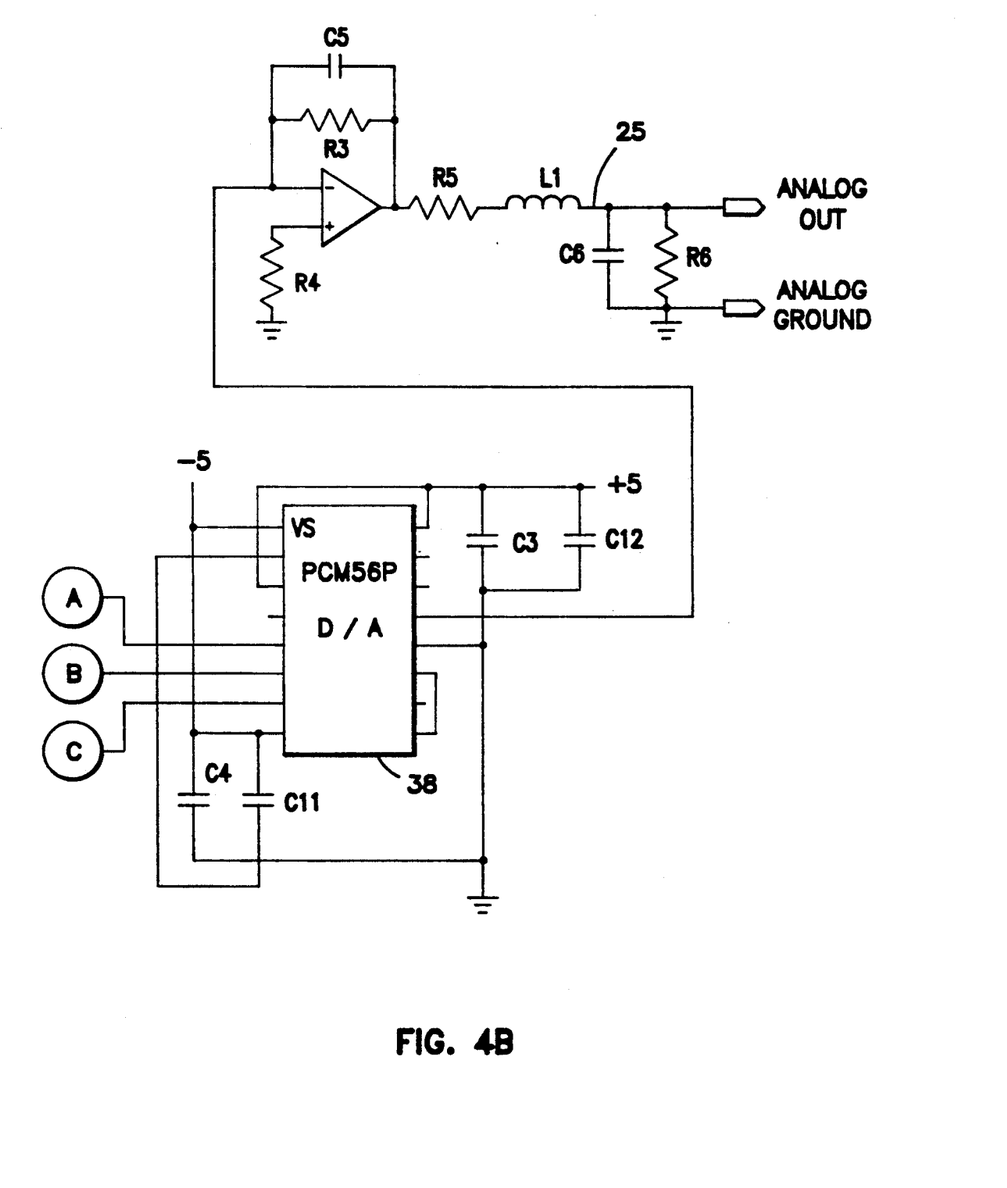

FIGS. 4A and 4B depict an illustrative and preferred hardware implementation of the output conversion module 22. It should be understood that alternate component choices and partitioning can be adopted by one of ordinary skill in the art without departing from the scope of this invention. In general, the system is built around the Intel 80C51 single-component microcomputer and related peripherals. The counter function to convert sensor 20 derived timing data into a number is partitioned between the microprocessor 40 and a pair of high speed CMOS synchronous counters 42 and 44. In operation, these counter stages collect clock counts originating with the 16 MHz system clock for a time period determined by the number of "recirculations" and the position of the magnet 18 on the waveguide 12. The lower order bytes are contained in counters 42 and 44 while an internal counter within the processor chip 40 collects the high order byte. Software converts the 24 bit "raw count" number to a 16 bit format for use in computations. This process is further described in connection with the flowcharts (see FIGS. 8A and 8B).

In the preferred embodiment the output conversion module 22 shares the same housing as the sensor module 20 logic. Consequently, space is at a premium and several combinational logic functions have been collected into a "custom" chip 36. The CMOS programmable electrically erasable logic device (PEEL) performs several functions. An equivalent schematic is provided as FIG. 5.

Figure 5:
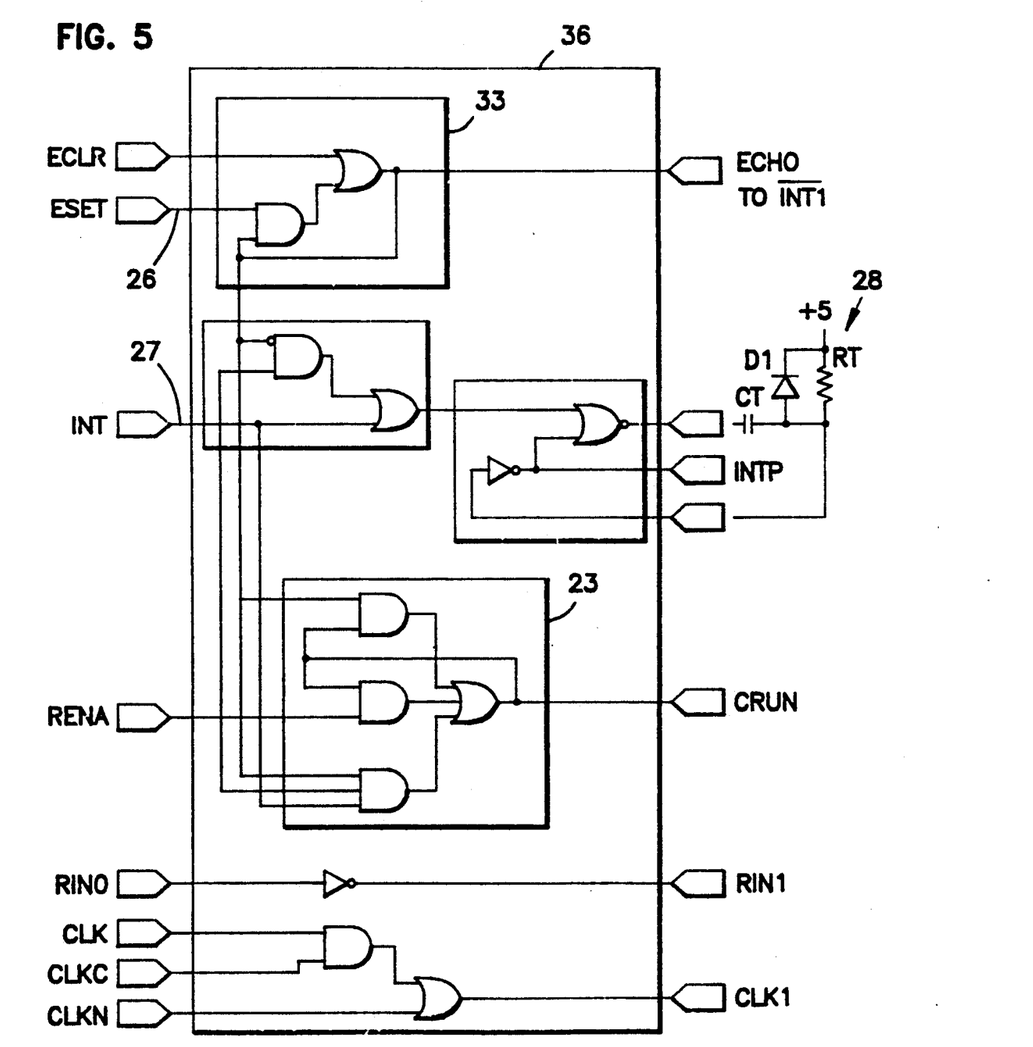
FIG. 5 is an equivalent logic schematic for a custom chip used in the illustrative embodiment of the invention.

FIG. 5 shows the logic which governs interaction with the sensor module. In operation an interrogate command issued by the microprocessor is delivered on connection 27 of the peel chip 36. This signal triggers the monostable 28 to generate the appropriate pulse in the sensor module 20. This signal is also supplied to the counter run logic 23 to enable the counters so that they may collect counts.

Echo signals received from the sensor module 20 are applied to the ESET pin 3 of the PEEL 36. These echo pulses are also supplied via the echo latch to the microprocessor through the INT1 pin of the processor 40. This INT1 interrupt decrements the internal recirculation counter of the microprocessor 40. While the recirculation counter is decremented by each echo the next interrogate signal is initiated by the ECHO signal re-triggering the monostable through the recirculation control logic. In preparation for the reception of the last recirculation echo the processor pulls RENA, recirculation enable, high to disable CRUN after the reception of the last echo. In this fashion the value of raw count in the counter is "frozen". This hybrid software/hardware system prevents interrupt service latency from perturbing the raw count data.

FIG. 5 also depicts the logic used to implement the hardware portion of the velocity adaptive noise window. In general the echo latch is used to inhibit or blank certain echo pulses present on ESET which do not meet the velocity adaptive window criteria. During the noise blanking interval the processor maintains the ECLR high. At the conclusion of the noise inhibit time interval the ECL line is taken low in preparation for the returning echo. After ECLR is low the next sensor 20 echo signal, to arrive at ESET forces ESET low which latches ECHO low until the processor is ready to re-enable the system by removing the ECLR signal.

Defining Set Points

Figure 8A:
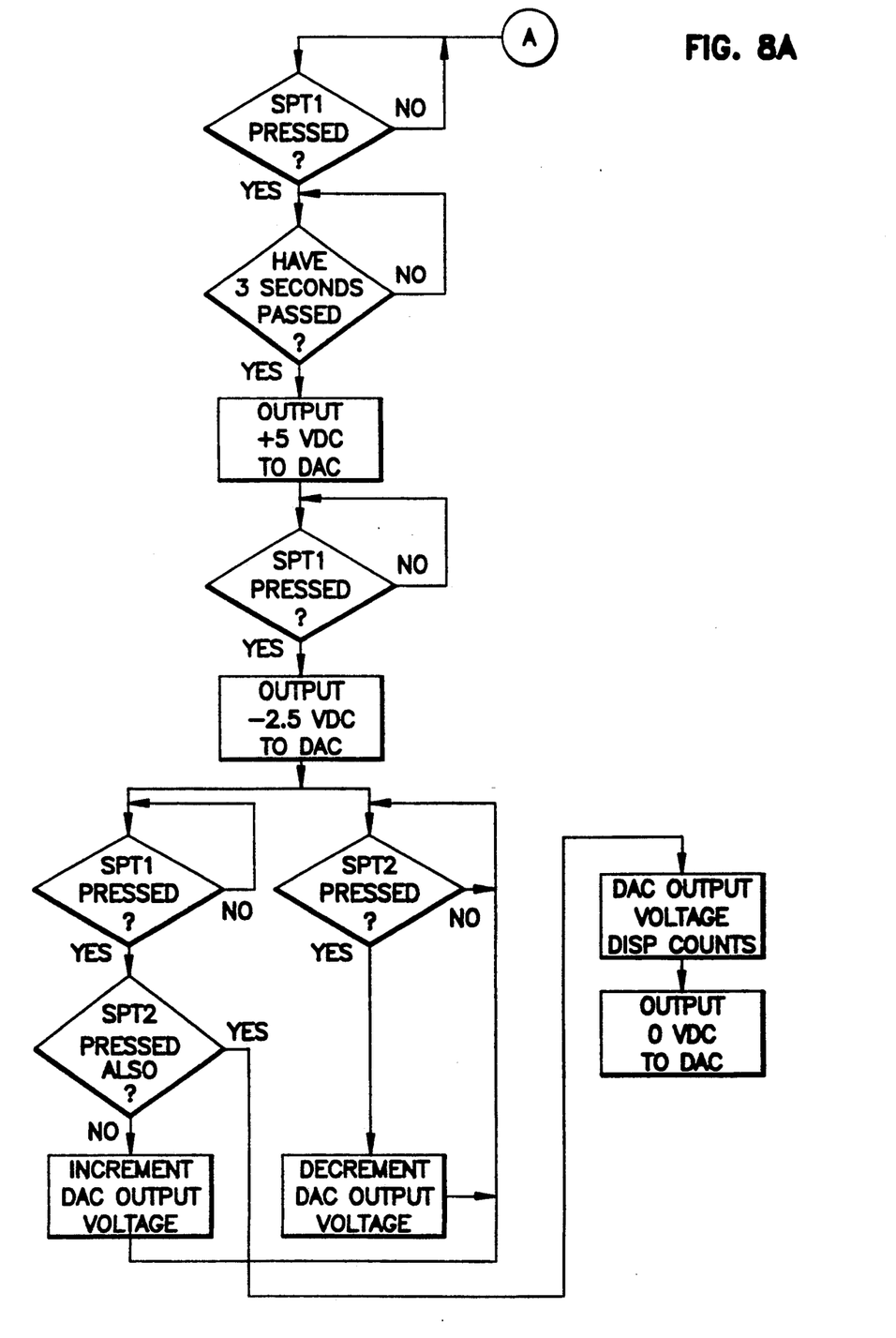
FIGS. 8A and 8B are a flowchart depicting the software structure of the invention for establishing user-defined set points.
Figure 8B:
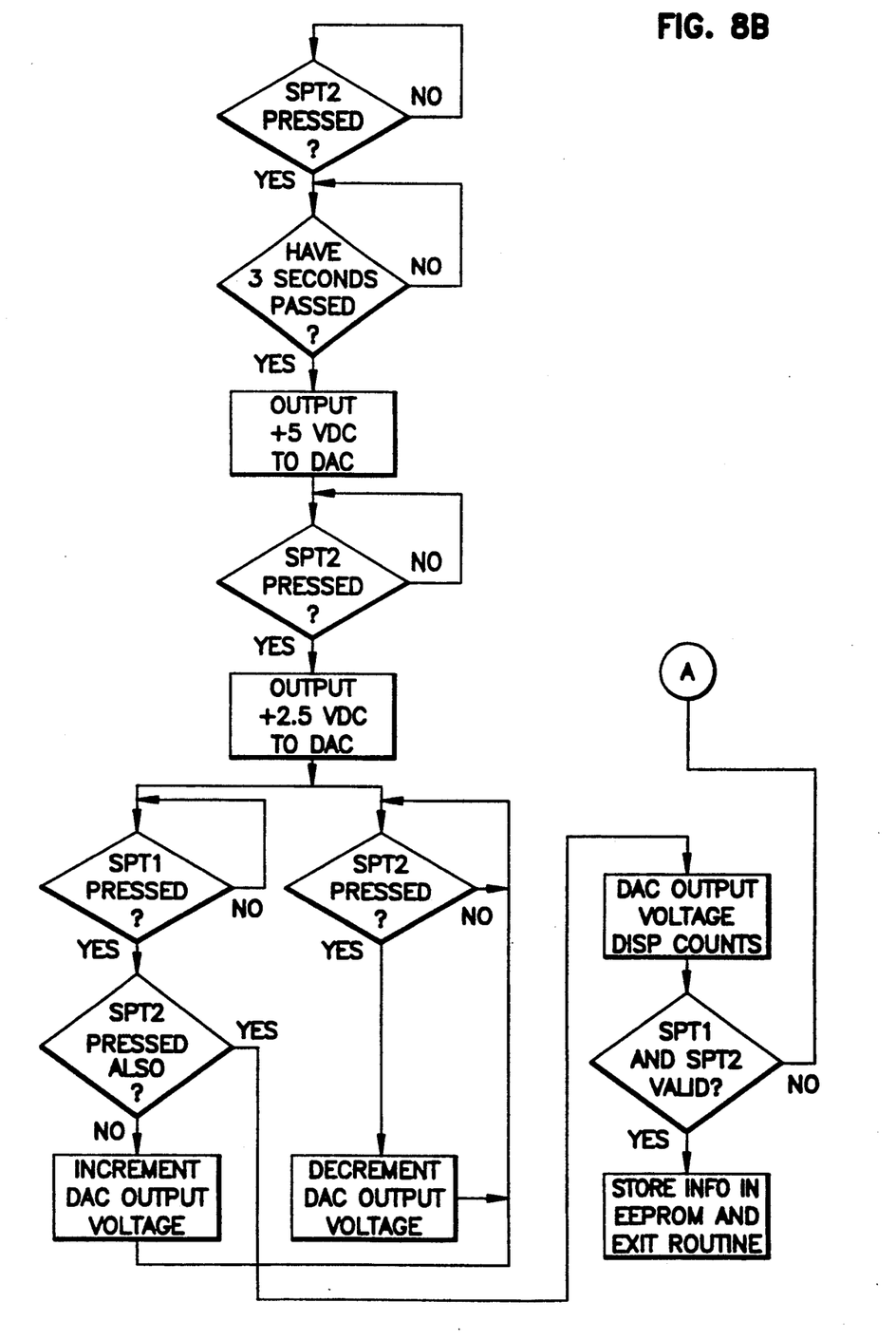

When the system is initially powered up, the user selects the two set points which define the active stroke. The software, as executed by the microprocessor 40, for achieving this is illustrated in FIGS. 8A and 8B. First, the user moves the magnet 18 to the first set point "SP1" and depresses switch SPT1 (see FIG. 4A). After three seconds, the microprocessor 40 acknowledges the switch SPT1 by setting the output voltage at 16-BIT DAC38 to 5 volts. The user next depresses the SPT2 switch (see FIG. 4A) and generates a −2.5 volt output signal corresponding to set point 2, "SP2". With the set point location defines, the user proceeds to select the desired output voltage for the set point. The user depresses either SPT1 or SPT2 to move the output voltage level in either the positive or negative direction respectively. Once the desired voltage level is achieved this voltage set point is stored by depressing and then releasing the SPT1 and SPT2 switches simultaneously to store the voltage value to the non-volatile memory 48.

Release of the switches SPT1 and SPT2 at this time, causes the microprocessor 40 to acquire the "count" value for the first set point SP1 and to store this value in non-volatile memory 48.

In setting the second set point SP2, the similar procedures are used as described in setting the first set point SP1.

The second set point is set by moving the magnet to the desired location and then depressing the SPT1 switch, for three seconds. The processor acknowledges the switch by setting the output voltage to 5 volts. The user next depresses the SPT2 switch and the processor generates a −2.5 volt output signal. The corresponding voltage is selected by depressing either SPT1 or SPT2 to move the output voltage value to the desired level. With both set point defined, the user depresses and releases the SPT1 and SPT2 switches simultaneously.

The transducer enters the normal operating mode and produces a scaled linear output voltage for magnet positions between the two set points.

Defining Velocity Adaptive Window

The velocity adaptive window is used to accept or reject raw count data from the counter. In general, the processor computes an inhibit time interval which is used to disable reception of echoes from the waveguide until just prior to the expected reception time. Under certain operating conditions this minimum window can be doubled up to four times. In this fashion the window adapts to accommodate the measured magnet velocity.

Figure 6A:
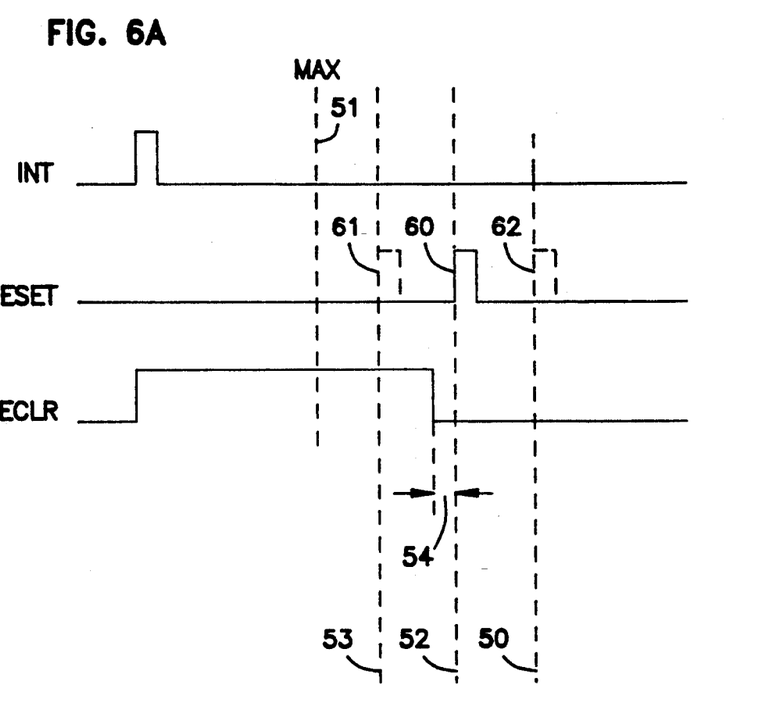
FIG. 6A is a waveform diagram depicting signal timing information.
Figure 6B:
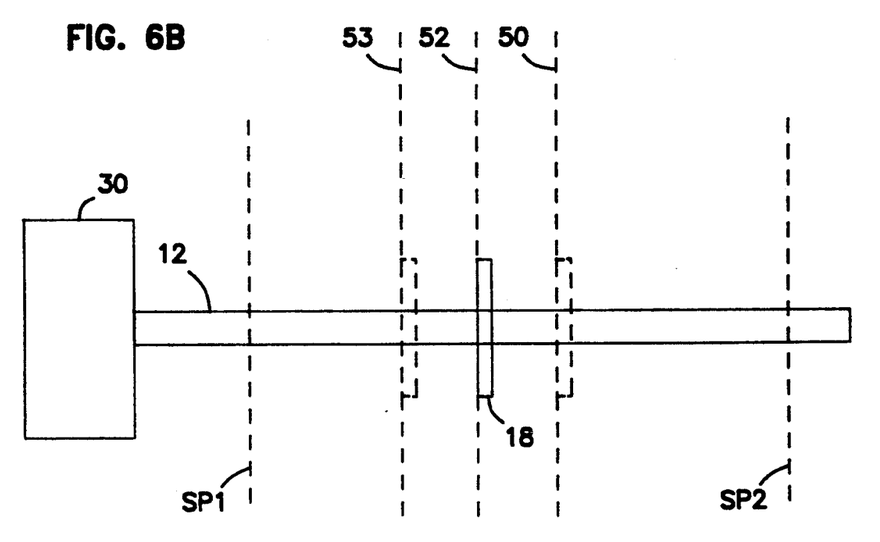
FIG. 6B is a schematic diagram depicting magnet locations corresponding to several signals set forth on FIG. 6A.

FIG. 6A shows a simplified illustrative timing diagram which should be considered along with FIG. 6B which depicts the physical location of the magnet 18. In the figure the interrogation pulse is represented by pulse 58. The corresponding echo is represented by 60 which corresponds to the magnet position line 52. The inhibit window corresponds to the ECLR signal. In the example, the echo occurs shortly after the ECLR signal goes low. In general, it is desired to have an acceptance window 54 which is quite short on the order of 5 microseconds as shown by reference numeral 54. The next inhibit time interval will be set to expire 5 microseconds from the last position measurement. However, if the magnet is moving rapidly toward the mode convertor as indicated by position line 53, then the next echo pulse 61 could occur "too" soon prior to the time out of the inhibity timer. In this instance the echo pulse "count" is compared with a predefined maximum window value corresponding to position line 51. If the echo has violated the noise window as defined by ECLR, but is still within the maximum acceptance window, the acceptance window 54 will be doubled (to 10 microseconds in the example). The acceptance window will remain at the doubled value, to accommodate these echoes. To reset the acceptance window to its smallest value requires removal of power and re-starting the system. However the process is adaptive so the acceptance window has the smallest value consistent with magnet velocity for the specific application. It is preferred to have the adaption process permit doubling 4 times, permitting dynamic expansion of the noise window to 16 times its original value. If the magnet 18 moves away for the housing 30 as indicated by position line 50 and echo pulse 62; then no alteration of the window value is made. Thus the noise adaptive window is only altered by magnet 18 motion toward the housing 30.

Figure 7:
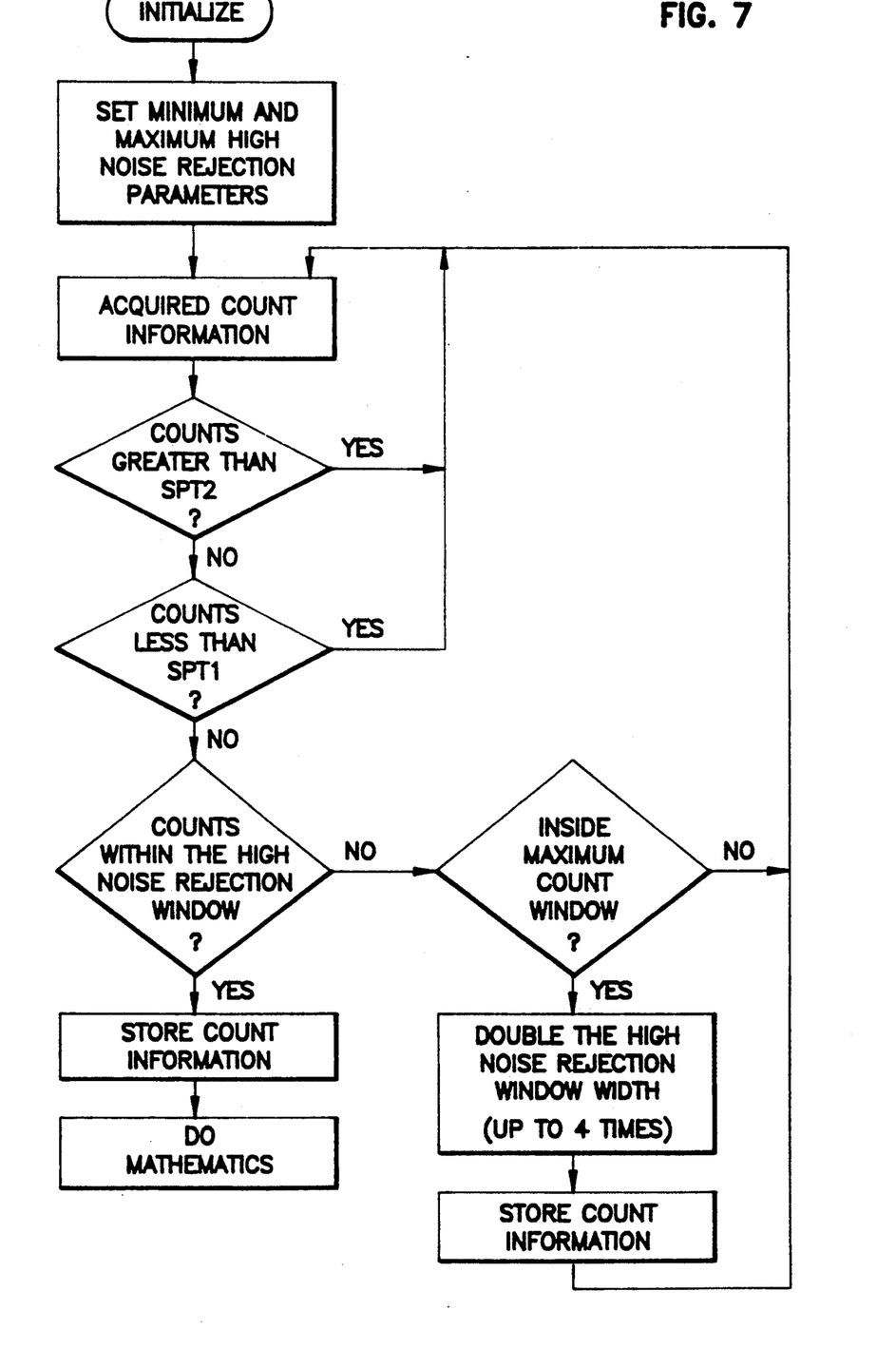
FIG. 7 is a flowchart depicting the software structure of the invention for the velocity adaptive noise rejection.

FIG. 7 is a flowchart showing the microprocessor routine for executing the velocity adaptive window technique for noise rejection. The routine involves two levels of noise rejection. Upon receipt of a return echo, which will be a value in counts, the microprocessor evaluates the return echo count to determine if it is between the user-defined endpoints. In order to be between the endpoints, the count must be greater than (SPT2) and less than (SPT1). Otherwise, the count indicates that the magnet is at an undefined position on the waveguide. If the count does not satisfy this first test, it is rejected and another count is acquired from the microprocessor.

Next, the microprocessor evaluates the count to determine if it is within the minimum width noise-rejection time window. If the count is within this window, it is considered valid. The valid count is then stored in the non-volatile memory 48 and processed into an analog output voltage for a magnet position between the two set points.

If the count is not inside the minimum noise-rejection time window, the next level of noise rejection is executed to alter the size of the time window. If the count is outside of the maximum window and within the range determined by the user-defined endpoints, the count is considered to be noise and new count information is acquired immediately.

Otherwise, if the microprocessor determines that the count is outside the minimum window and inside the maximum window, the count is considered valid. This situation may result from a magnet velocity that is greater than the minimum window will allow. The time window is therefore doubled to allow for operation with a greater magnet velocity.

The count, which was outside the minimum window and inside the maximum window, is discarded to avoid lengthy mathematical processing. The waveguide is reinterrogated, and the microprocessor evaluates the new count to determine if it is within the new time window, which is double the previous window. If the count is still not within the current noise-rejection window, the window is again doubled. The minimum width noise-rejection window is allowed to double a maximum of four times. Thus, the minimum noise-rejection window can dynamically expand to sixteen times its original width.

Further details regarding the invention are set forth in the 52 page appendix filed with the application, and which forms a part of this specification.

What is claimed is:

1. A magnetostrictive transducer for generating an indication of the position of a magnet along a gauge comprising:

a magnetostrictive delay line, forming a gauge;

pulse generator means electrically coupled to said delay line for generating periodic electrical current interrogation pulses on said delay line in response to an interrogate signal;

said magnet proximate said delay line, for converting each of said interrogation pulses into corresponding acoustics pulses in said delay line, each of said acoustic pulses propagated along said delay line from the location of said magnet;

mode converter means coupled to said delay line for converting each of said acoustic pulses into corresponding electrical echo signals indicating the passage of said acoustic pulses past the location of said mode converter;

time interval measurement means coupled to said mode converter means and coupled to said pulse generator means, for converting the time interval between an interrogation signal and a corresponding echo signal into a position count number indicative of magnet position;

output conversion means coupled to said time interval measurement means for defining a first set point count number corresponding to the position on said delay line corresponding to the location of said position magnet in an arbitrarily selected first location along said delay line, and for defining a second set point count number corresponding to the position on said delay line of said position magnet in an arbitrarily selected second location along said delay line, and for converting said position count number to an output signal indicative of magnet location, when said magnet is located between said first location and second location.

2. The magnetostrictive transducer apparatus of claim 1 wherein said output conversion means further includes:

means for selecting and setting a first analog output signal corresponding to said first location;

means for selecting and setting a second analog output signal corresponding to said second location;

means for computing an analog output signal between said first and second output signals proportional to magnet position between said first and second locations.

3. The magnetostrictive transducer apparatus of claim 1 wherein said analog output signal is an analog voltage level.

* * * * *

UNITED STATES PATENT AND TRADEMARK OFFICE
CERTIFICATE OF CORRECTION

PATENT NO. : Patent No: 5,311,124

DATED : Issued: May 10, 1994

INVENTOR(S) : Hubbard et al.

It is certified that error appears in the above-identified patent and that said Letters Patent is hereby corrected as shown below:

On the cover page, under [75], line 2, please delete "Gary" and insert therefor --Cary--

In column 1, line 62, please delete the word "echo" and insert therefor --echoes--

In column 2, line 62, please delete the word "DRAWING" and insert therefor --DRAWINGS--

In column 3, line 34, after the word "waveguide", please insert --12--

In column 3, line 56, please delete the word "application" and substitute therefor --Application--

In column 3, line 57, please delete "Jan. 232," and insert therefor --Jan. 22,--

UNITED STATES PATENT AND TRADEMARK OFFICE
CERTIFICATE OF CORRECTION

PATENT NO. : Patent No: 5,311,124
DATED : Issued: May 10, 1994
INVENTOR(S) : Hubbard et al.

It is certified that error appears in the above-identified patent and that said Letters Patent is hereby corrected as shown below:

In column 5, lines 1 and 2, please delete "INT1" and insert therefor --INT1--

In column 5, line 39, please delete the word "defines" and insert therefor --defined--

In column 6, line 54, after "greater than", please insert --set point 2--

In column 6, line 55, after "less than", please insert --set point 1--

Signed and Sealed this

Eleventh Day of October, 1994

*Attest:*

BRUCE LEHMAN

*Attesting Officer*     *Commissioner of Patents and Trademarks*